(12) United States Patent
Zheng et al.

(10) Patent No.: US 9,609,713 B1
(45) Date of Patent: Mar. 28, 2017

(54) KIND OF PULSE WIDTH DIMMING CONTROL CIRCUIT FOR LED PHASE CUT DIMMING POWER SUPPLY

(71) Applicant: Zhuhai Shengchang Electronics Co., Ltd., Zhuhai (CN)

(72) Inventors: Dehua Zheng, Zhuhai (CN); Xianyun Zhao, Zhuhai (CN)

(73) Assignee: ZHUHAI SHENGCHANG ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 15/247,937

(22) Filed: Aug. 26, 2016

(30) Foreign Application Priority Data

Dec. 23, 2015 (CN) ..................... 2015 2 1084833 U

(51) Int. Cl.
 *H05B 33/08* (2006.01)
(52) U.S. Cl.
 CPC ..... *H05B 33/0845* (2013.01); *H05B 33/0812* (2013.01)
(58) Field of Classification Search
 CPC .... H05B 37/02; H05B 33/08; H05B 33/0809; H05B 33/0815; H05B 33/0818; H05B 33/0848; H05B 33/0881
 USPC ........ 315/200 R, 209 R, 224–226, 276, 291, 315/297, 307, 308, 312
 See application file for complete search history.

(56) References Cited

U.S. PATENT DOCUMENTS

2015/0257216 A1* 9/2015 Lys .................... H05B 33/0815
 315/201

\* cited by examiner

*Primary Examiner* — Jimmy Vu
(74) *Attorney, Agent, or Firm* — Gokalp Bayramoglu

(57) ABSTRACT

The invention discloses a kind of pulse width dimming control circuit for LED phase cut dimming power supply, which comprises LED phase cut dimming power supply circuit and pulse width dimming control circuit. The pulse width dimming control circuit is composed of voltage sampling amplification circuit, signal conversion circuit, photoelectric coupler and pulse width PWM control circuit. The signal input terminal of the voltage sampling amplification circuit is connected to the live wire L and the null line N after passing through the anti-interference circuit for voltage sampling. The output control part of the pulse width PWM control circuit consists of a field-effect transistor, the drain electrode of which connects to LED lamp. The Invention is a kind of pulse width dimming control circuit for LED phase cut dimming power supply, which has no restriction on load power and has strong compatibility with phase cut dimmer, wide dimming range.

4 Claims, 4 Drawing Sheets

US 9,609,713 B1

KIND OF PULSE WIDTH DIMMING CONTROL CIRCUIT FOR LED PHASE CUT DIMMING POWER SUPPLY

FIELD OF THE INVENTION

The Invention relates to the pulse width (PWM) dimming control circuit applied in LED phase cut dimming power supply.

BACKGROUND

With the development and wide application of LED illumination, LED phase cut dimming power supply is more and more widely used since it is convenient for user's installation and wire arrangement. However, at present, most of LED phase cut dimming power supplies applied produce the dimming effect by reducing the output power through the adjustment of the input to restrict the power. Such a method has a certain restriction on the load power. When the load power is lower than a certain range, the dimming effect will become poorer, and there would be poor compatibility with the phase cut dimmer, narrow dimming range and other shortcomings. Some adopt the output pulse width (PWM) dimming control circuit. However, the primary sampling signal of LED phase cut dimming power supply is transmitted to the secondary directly through the optocoupler, and then the signal is converted into a pulse width (PWM) with a single-chip microcomputer to control the output voltage pulse width of LED phase cut dimming, power supply. Although this method does not restrict the load power, great temperature drift of the optocoupler will result in signal voltage distortion, and the output voltage pulse width of LED phase cut dimming power supply will be affected. In addition, since the single-chip microcomputer is adopted, the levels of output pulse width (PWM) dimming is generally divided into 256 ones, and the dimming elect changes in steps. So, the gentleness of the dimming effect is not good enough.

To sum up, in the existing technologies, LED phase cut dimming power supply has restriction on load power, poor compatibility with the phase cut dimmer, narrow dimming range, great temperature drift, poor dimming effect and other defects.

SUMMARY OF THE INVENTION

The technical problem to be solved by the invention is to overcome the drawbacks of the prior art and to provide a kind of pulse width (PWM) dimming control circuit for LED phase cut dimming power supply, which has no restriction, on load power and has strong compatibility with the phase cut dimmer, wide dimming range, low temperature drift and good dimming effect and is compatible with the flout phase cut (leading edge) and the rear phase cut (lagging edge) dimmer.

The technical solution of the Invention is: the Invention comprises LED phase cut dimming power supply circuit and pulse width dimming control circuit. The LED phase cut dimming power supply circuit includes the anti-interference circuit. The pulse width dimming control circuit is composed of voltage sampling amplification circuit, signal conversion circuit, photoelectric coupler and pulse width (PWM) control circuit, which are made with electric connection in turn and connected to the corresponding LED phase cut dimming power supply circuit. The LED phase cut dimming power supply circuit is composed of main supply input live line terminal, null line terminal, power supply terminal I, power supply terminal II, circuit public terminal I and circuit public terminal II. The signal input terminal of the voltage sampling amplification circuit is connected to the main supply input live line terminal and null line terminator to the LED phase cut dimming main power supply input live line L and the null line N after passing through the anti-interference circuit for voltage sampling. The output control part of the pulse width PWM control circuit consists of a field-effect transistor, the drain electrode of which connects to LED lamp, while the source electrode of which connects to the circuit public terminal II.

The voltage sampling amplification circuit comprises diode I, diode IL resistance I, resistance II, resistance III, resistance IV, resistance V, resistance VI, capacitance I, capacitance II and comparing amplifier integrated chip. The anode of the diode I and that of the diode II are respectively connected to the main supply input live line terminal and null line terminator to the LED phase cut dimming main power supply input live line L and the null line N after passing through the anti-interference circuit for voltage sampling. The cathode of the diode I and that of the diode II are connected with each other and connected to one end of the resistance I. The other end of the resistance I is connected to one end of the resistance II and one end of the resistance III. The other end of the resistance II is connected to the circuit public terminal I, and the other end of the resistance III is connected to the capacitance I and the $1^{st}$ pin of the comparing amplifier integrated chip. The other end of the capacitance I (C1) is connected to the circuit public terminal I (GND). The $2^{nd}$ pin of the comparing amplifier integrated chip is connected to the circuit public terminal I. The $3^{rd}$ pin of the comparing amplifier integrated chip is connected to one end of the resistance IV and one end of the resistance V. The other end of the resistance IV is connected to the circuit public terminal I, and the other end of the resistance V is connected to the resistance VI and the $4^{th}$ pin of the comparing amplifier integrated chip. The $5^{th}$ pin of the comparing amplifier integrated chip is connected to the power output terminal I. The other end of the resistance VI is connected to one end of the capacitance II and the signal conversion circuit. The other end of the capacitance II is connected to the circuit public terminal I.

The signal conversion circuit comprises comparator integrated chip, linear voltage regulator integrated chip, diode III, NPN triode I, NPN triode II, PNP triode I, resistance VII, resistance VII, resistance IX, resistance X, resistance XI, resistance XII, resistance XIII, resistance XIV and capacitance III. The $1^{st}$ pin of the comparator integrated chip is connected to one end of the resistance XI and the base of NPN triode I. The other end of the resistance XI is connected to the power output terminal I. The $2^{nd}$ pin of the comparator integrated chip is connected to the voltage sampling amplification circuit. The $3^{rd}$ pin of the comparator integrated chip is connected to the $6^{th}$ pin of the comparator integrated chip, the anode of the diode III and one end of resistance VII. The $4^{th}$ pin of the comparator integrated chip is connected to the circuit public terminal I. The $5^{th}$ pin of the comparator integrated chip is connected to one end of the resistance VIII, one end of the resistance IX and one end of the resistance X. The other end of the resistance VIII is connected to the $7^{th}$ pin of the comparator integrated chip and the cathode of the diode III. The other end of the resistance X is connected to the circuit public terminal I. The other end of the resistance IX is connected to the other end of the resistance VII, one end of the capacitance III and the $1^{st}$ pin of the linear voltage regulator integrated chip. The other end of the capacitance III is connected to the circuit public terminal I. The $2^{nd}$ pin of the linear voltage regulator integrated chip is connected to the circuit public terminal I. The $3^{rd}$ pin of the linear voltage regulator integrated chip is connected to the power output terminal I. The emitter of the NPN triode I is connected to the circuit public terminal I. The collector of the NPN triode I is connected to one end of the resistance XII, the base of NPN triode II and the base of PNP triode I. The other end of the resistance XII is connected to the power output terminal I. The collector of the NPN triode II is connected to the power output terminal I. The emitter of the NPN triode II is connected to the emitter of the PNP triode I, one end of the resistance XIII and one input end of the photoelectric coupler and pulse width PWM control circuit. The collector of the PNP triode I is connected to the circuit public terminal I. The other end of the resistance XIII is connected to one end of the resistance XIV and the other input end of the photoelectric coupler and pulse width PWM control circuit. The other end of the resistance XIV is connected to the circuit public terminal I.

The photoelectric coupler and pulse width PWM control circuit comprises photoelectric coupling integrated chip, NPN triode III, NPN triode IV, PNP triode II, field-effect transistor, resistance XV, resistance XVI, resistance XVII and resistance XVIII. The $1^{st}$ pin of the photoelectric coupling integrated chip is connected to one output end of the signal conversion circuit. The $2^{nd}$ pin of the photoelectric coupling integrated chip is connected to the other output end of the signal conversion circuit. The $3^{rd}$ pin of the photoelectric coupling integrated chip is connected to one end of the resistance XV and the base of NPN triode III. The $4^{th}$ pin of the photoelectric coupling integrated chip is connected to the circuit public terminal II. The other end of the resistance XV is connected to the power output terminal II. The emitter of the NPN triode III is connected to the circuit public terminal II. The collector of the NPN triode III is connected to one end of the resistance XVI, the base of NPN triode IV and the base of PNP triode II. The other end of the resistance XVI is connected to the power output terminal II. The collector of the NPN triode IV is connected to the power output terminal II. The emitter of the NPN triode IV is connected to the emitter of the PNP triode II and one end of the resistance XVII. The collector of the PNP triode II is connected to the circuit public terminal II. The other end of the resistance XVII is connected to one end of the resistance XVII and the grid electrode of the field-effect transistor. The other end of the resistance XVII is connected to the circuit public terminal II. The source electrode of the field-effect transistor is connected to the circuit public terminal II. The drain electrode of the field-effect transistor is connected to the cathode of the LED lamp that requires dimming.

The beneficial effects of the Invention are: the Invention comprises LED phase cut dimming power supply circuit and pulse width dimming control circuit. The pulse width dimming control circuit is composed of voltage sampling amplification circuit, signal conversion circuit, photoelectric coupler and pulse width (PWM) control circuit, which are made with electric connection in turn and connected to the corresponding LED phase cut dimming power supply circuit. The LED phase cut dimming power supply circuit is composed of anti-interference circuit, main supply input live line terminal, null line terminal, power supply terminal I, power supply terminal II, circuit public terminal I and circuit public terminal II. The signal input terminal of the voltage sampling amplification circuit is connected to the main supply input live line terminal and null line terminator to the LED phase cut dimming main power supply input live line L and the null line N after passing through the anti-interference circuit for voltage sampling. The output control part of the pulse width PWM control circuit consists of a field-effect transistor, the drain electrode of which connects to LED lamp, while the source electrode of which connects to the circuit public terminal II. The voltage sampling amplification circuit collects AC voltage signal at the primary main supply input, terminal of LED phase cut dimming power supply and converts it into DC voltage signal by decompression filter. The DC voltage signal is amplified through the comparing amplifier integrated chip and its peripheral components. And then the amplified DC voltage signal is converted into the pulse width (PWM) signal through the comparator integrated chip and its peripheral components in the signal conversion circuit. And the pulse width (PWM) signal is transmitted to the pulse width (PWM) control circuit through the photoelectric coupling integrated chip. The pulse width (PWM) signal is used to control the field-effect transistor. The output anode of LED phase cut dimming power supply passes through the external LED lamp and the field-effect transistor and then returns to the output cathode AGND. Therefore, the lighting intensity of LED lamp changes with the change of the pulse width (PWM) signal imposed to the grid electrode of the field-effect transistor, thereby achieving the dimming effect. The Invention converts the voltage signal obtained by the primary sampling and amplification of LED phase cut dimming power supply into the pulse width (PWM) signal at the primary side and then transmits it through the photoelectric coupler to the pulse width (PWM) control circuit to control the lighting intensity of the LED lamp connecting to the output terminal of LED phase cut dimming power supply. Therefore, it eliminates the signal distortion caused by the optocoupler temperature drift. Moreover, the pulse width (PWM) signal converted with the use of the signal conversion circuit, which is composed of the comparator or the amplifier, does not have levels, making the dimming light more gentle. Therefore, the Invention is a kind of LED phase cut dimming power supply, which has no restriction on load power and has strong compatibility with the phase cut dimmer, wide dimming range, low temperature drift and good dimming effect.

DETAILED DESCRIPTION OF THE EMBODIMENT

Figure 1:
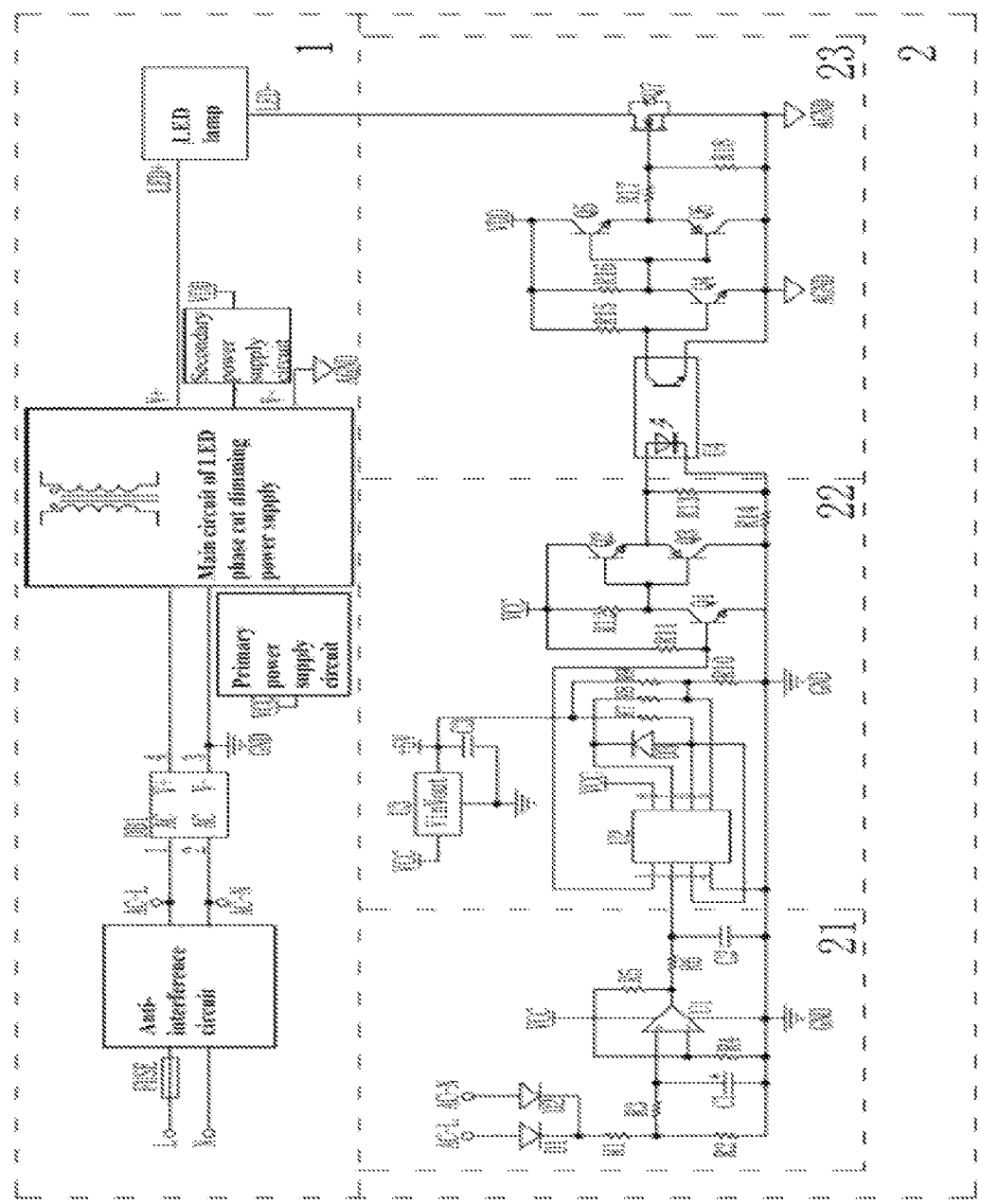
FIG. 1 is a schematic diagram of the embodiment circuit of the Invention.
Figure 2:
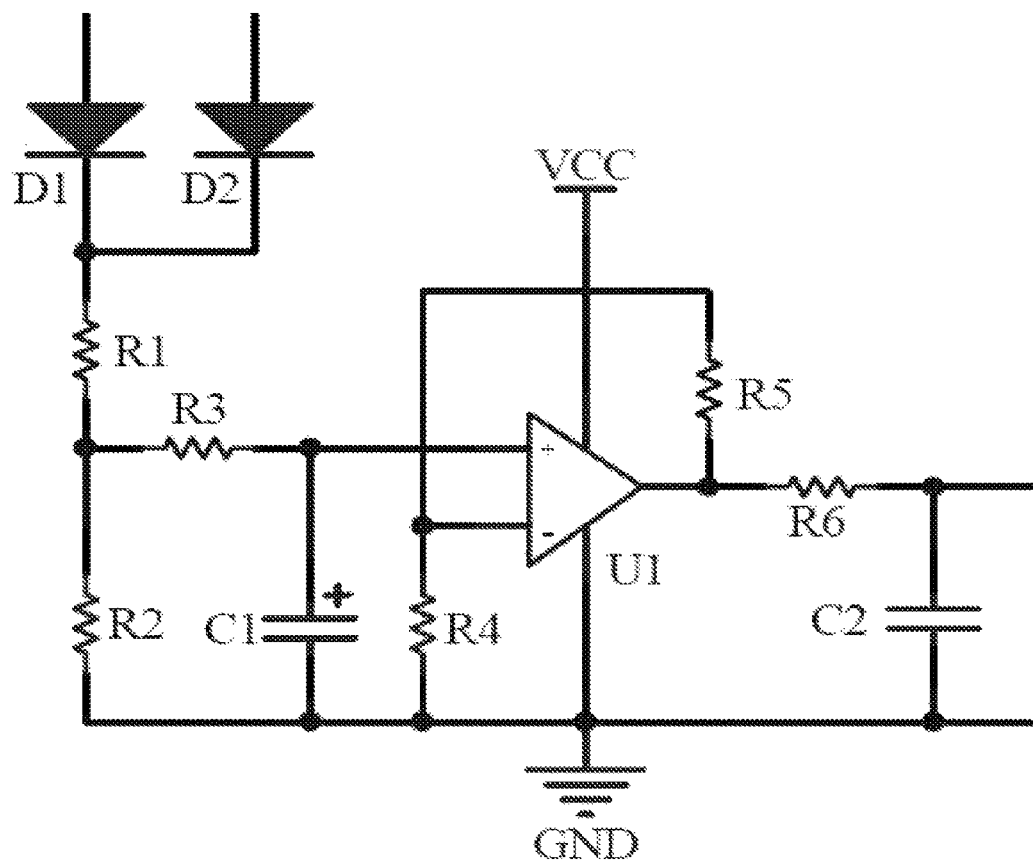
FIG. 2 is a schematic diagram of the voltage sampling amplification circuit of the Invention.
Figure 3:
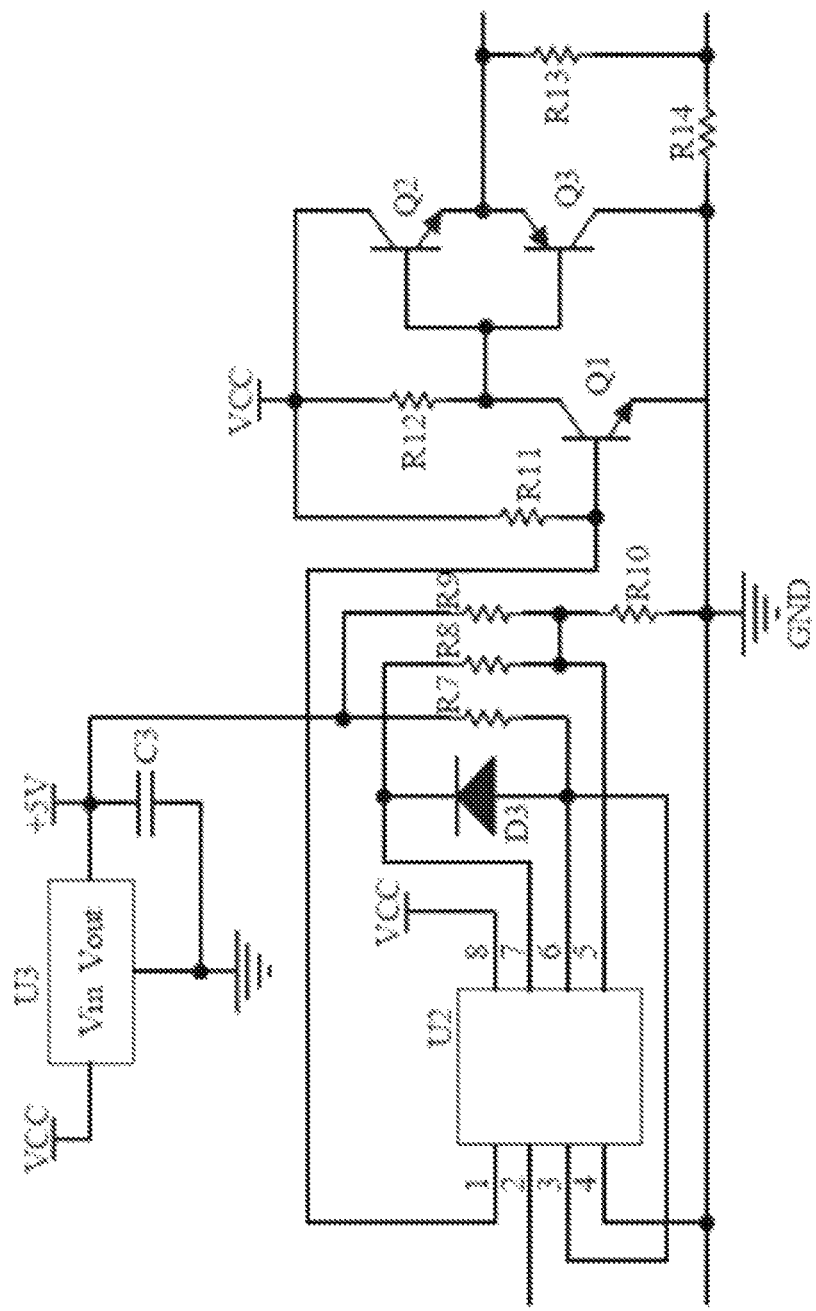
FIG. 3 is a schematic diagram of the signal conversion circuit of the Invention.
Figure 4:
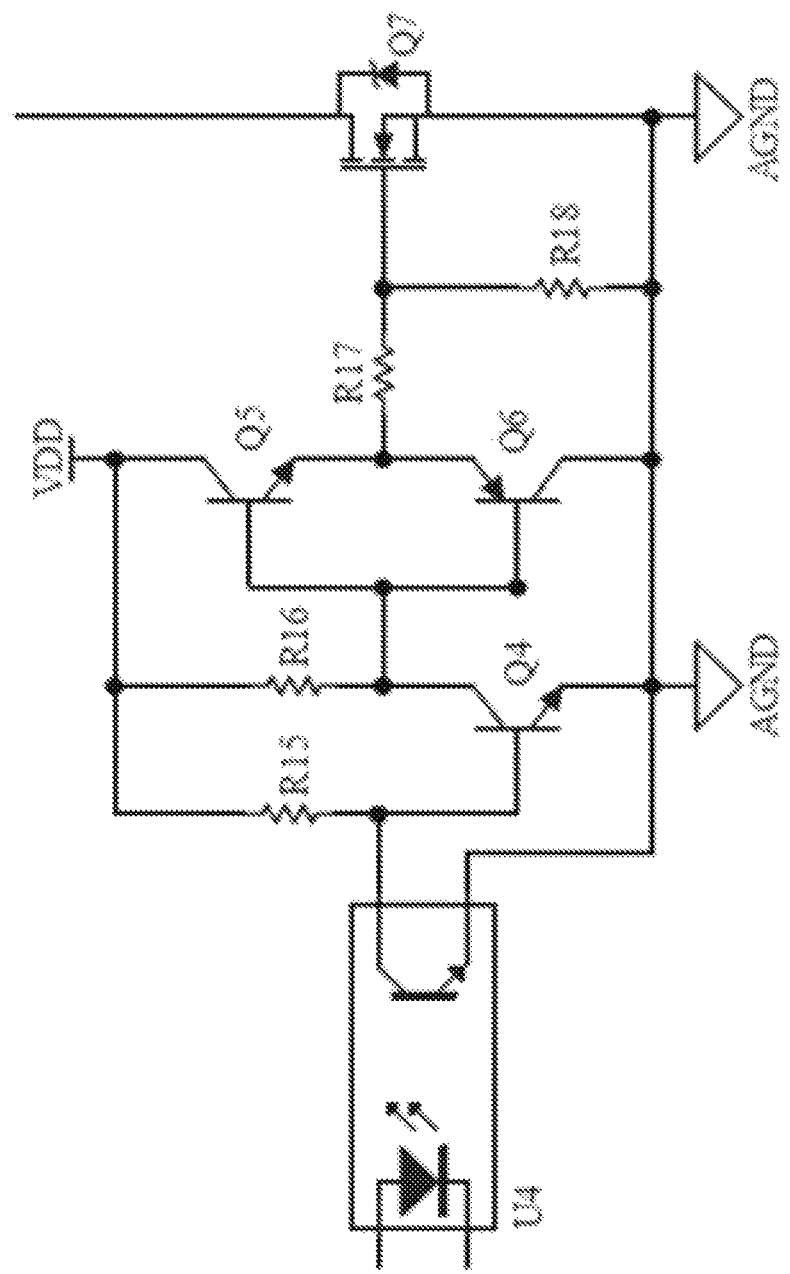
FIG. 4 is a schematic diagram of the photoelectric coupler and pulse width (PWM) control circuit of the Invention.

As shown in FIG. 1 to FIG. 4, the Invention comprises LED phase cut dimming power supply circuit. 1 and pulse width dimming control circuit 2. Pulse width dimming control circuit 2 is composed of voltage sampling amplification circuit 21, signal conversion circuit 22, photoelectric coupler and pulse width (PWM) control circuit 23, which are made with electric connection in turn and connected with corresponding LED phase cut dimming power supply circuit. LED phase cut dimming power supply circuit 1 is composed of anti-interference circuit, main supply input live line terminal L, null line terminal N, power supply terminal I VCC, power supply terminal II VDD, circuit public terminal I GND and circuit public terminal II AGND. The signal input terminal of voltage sampling amplification circuit 21 is connected to the main supply input live line terminal L and null line terminal N or to the LED phase cut dimming main power supply input live line AC–L and the null line AC–N after passing through the anti-interference circuit for voltage sampling. The output control part of the pulse width PWM control circuit 23 consists of a field-effect transistor, the drain electrode of which connects to LED lamp, while the source electrode of which connects to circuit public terminal II AGND.

Voltage sampling amplification circuit 21 comprises diode I D1, diode II D2, resistance I R1, resistance II R2 resistance III R3, resistance IV R4, resistance V R5, resistance VI R6, capacitance I C1, capacitance II C2 and comparing amplifier integrated chip U1. Anode of diode I D1 and that of diode II D2 are respectively connected to anti-interference circuit output terminal live line AC–L and anti-interference circuit output terminal null line AC-N. The cathode of diode I D1 and that of diode II D2 are connected with each other and connected to one end of resistance I R1. The other end of resistance I R1 is connected to one end of resistance II R2 and one end of resistance III R3. The other end of resistance II R2 is connected to circuit public terminal I GND, and the other end of resistance III R3 is connected to capacitance I C1 and the 1$^{st}$ pin of the comparing amplifier integrated chip U1. The other end of capacitance I C1 is connected to circuit public terminal I GND. The 2$^{nd}$ pin of the comparing amplifier integrated chip U1 is connected to circuit public terminal I GND. The 3$^{rd}$ pin of the comparing amplifier integrated chip U1 is connected to one end of resistance IV R4 and one end of resistance V R5. The other end of resistance IV R4 is connected to circuit public terminal I GND, and the other end of resistance V R5 is connected to resistance VI R6 and the 4$^{th}$ pin of comparing amplifier integrated chip U1. The 5$^{th}$ pin of comparing amplifier integrated chip U1 is connected to power output terminal I VCC. The other end of resistance VI R6 is connected to one end of capacitance II C2 and the signal conversion circuit. The other end of capacitance II C2 is connected to circuit public terminal I GND.

Signal conversion circuit 22 comprises comparator integrated chip U2, linear voltage regulator integrated chip U3, diode III D3, NPN triode I Q1, NPN triode II Q2, PNP triode I Q3, resistance VII R7, resistance VIII R8, resistance IX R9, resistance X R10, resistance XI R11, resistance XII R12, resistance XIII R13, resistance XIV R14 and capacitance III C3. The 1$^{st}$ pin of comparator integrated chip U2 is connected to one end of resistance XI R11 and the base of NPN triode I Q1. The other end of resistance XI R11 is connected to power output terminal I VCC. The 2$^{nd}$ pin of comparator integrated chip U2 is connected to the voltage sampling amplification circuit. The 3$^{rd}$ pin of comparator integrated chip U2 is connected to the 6$^{th}$ pin of comparator integrated chip U2, the anode of diode III D3 and one end of resistance VII R7. The 4$^{th}$ pin of comparator integrated chip U2 is connected to circuit public terminal I GND. The 5$^{th}$ pin of comparator integrated chip U2 is connected to one end of resistance VIII R8, one end of resistance IX R9 and one end of resistance X R10. The other end of resistance VIII R8 is connected to the 7$^{th}$ pin of comparator integrated chip U2 and the cathode of diode III D3. The other end of resistance X R10 is connected to circuit public terminal I GND. The other end of resistance IX R9 is connected to the other end of resistance VII R7, one end of capacitance III C3 and the 1$^{st}$ pin of linear voltage regulator integrated chip U3. The other end of capacitance III C3 is connected to circuit public terminal I GND. The 2$^{nd}$ pin of linear voltage regulator integrated chip U3 is connected to circuit public terminal I GND. The 3$^{rd}$ pin of linear voltage regulator integrated chip U3 is connected to power output terminal I VCC. The emitter of NPN triode I Q1 is connected to circuit public terminal I GND. The collector of NPN triode I Q1 is connected to one end of resistance XII R12, the base of NPN triode II Q2 and the base of PNP triode I Q3. The other end of resistance XII R12 is connected to power output terminal I VCC. The collector of NPN triode II Q2 is connected to power output terminal I VCC. The emitter of NPN triode II Q2 is connected to the emitter of PNP triode I Q3, one end of resistance XIII R13 and one input end of the photoelectric coupler and pulse width PWM control circuit. The collector of PNP triode I Q3 is connected to circuit public terminal I GND. The other end of resistance XIII R13 is connected to one end of resistance XIV R14 and the other input end of the photoelectric coupler and pulse width PWM control circuit. The other end of resistance XIV R14 is connected to circuit public terminal I GND.

The photoelectric coupler and pulse width PWM control circuit 23 comprises photoelectric coupling integrated chip U4, NPN triode III Q4, NPN triode IV Q5, PNP triode II Q6, field-effect transistor Q7, resistance XV R15, resistance XVI R16, resistance XVII R17 and resistance XVIII R18. The 1$^{st}$ pin of photoelectric coupling integrated chip U4 is connected to one output end of the signal conversion circuit. The 2$^{nd}$ pin of photoelectric coupling integrated chip U4 is connected to the other output end of the signal conversion circuit. The 3$^{rd}$ pin of photoelectric coupling integrated chip U4 is connected to one end of resistance XV R15 and the base of NPN triode III Q4. The 4$^{th}$ pin of photoelectric coupling integrated chip U4 is connected to circuit public terminal II AGND. The other end of resistance XV R15 is connected to power output terminal II VDD. The emitter of NPN triode III Q4 is connected to circuit public terminal II AGND. The collector of NPN triode III Q4 is connected to one end of resistance XVI R16, the base of NPN triode IV Q5 and base of PNP triode II Q6. The other end of resistance XVI R16 is connected to power output terminal II VDD. The collector of NPN triode IV Q5 is connected to power output terminal II VDD. The emitter of NPN triode IV Q5 is connected to the emitter of PNP triode II Q6 and one end of resistance XVII R17. The collector of PNP triode II Q6 is connected to circuit public terminal II AGND. The other end of resistance XVII R17 is connected to one end of resistance XVII R18 and the grid electrode of field-effect transistor Q7. The other end of resistance XVII R18 is connected to circuit public terminal II AGND. The source electrode of field-effect transistor Q7 is connected to circuit public terminal II AGND. The drain electrode of field-effect transistor Q7 is connected to the cathode of the LED lamp that requires dimming.

In the Embodiment, voltage sampling amplification circuit 21 collects the AC voltage signal and input it to LED phase cut dimming power supply through diode D1, diode D2, resistance R1, resistance R2, resistance R3 and capacitance C1 and obtain a smoother DC voltage signal by decompression filler. Such a DC voltage signal changes with the change of the average or effective value of the AC voltage signal input to the LED phase cut dimming power supply, and then is amplified through the signal amplification circuit which consists of comparing amplifier integrated chip U1, resistance R4 and resistance R5, and is transmitted to the signal conversion circuit through resistance R6 and capacitance C2. Signal conversion circuit 22 converts the amplified DC voltage signal into a pulse width (PWM) signal, the duty cycle of which changes with the change of DC voltage signal, through comparator integrated chip U2, diode D3, resistance R7, resistance R8, resistance R9, resistance R10, capacitance C3 and linear voltage regulator integrated chip U3. Then the pulse width (PWM) signal current is amplified through resistance R11, resistance R12, resistance R13, resistance R14, triode Q1, triode Q2 and triode Q3. The photoelectric coupler in the photoelectric coupler and pulse width (PWM) control circuit 23 transmits the pulse width (PWM) converted in the signal conversion circuit to the pulse width (PWM) control circuit. Apart from passing the pulse width (PWM) signal, the photoelectric coupler also plays the role of safety isolation. It is an indispensable part of the safety regulation of the whole LED phase cut dimming power supply. The pulse width (PWM) signal amplifies the current through resistance R15, resistance R16, resistance R17, resistance R18, triode Q4, triode Q5 and triode Q6 to drive field-effect transistor Q7, so as to control the output volume of the main circuit of the LED phase cut dimming power supply, thereby achieving the control over the lighting intensity of LED lamp.

The Invention uses the primary anti-interference circuit of the LED phase cut dimming power supply for sampling and finally uses the pulse width (PWM) signal to control field-effect transistor Q7 in the pulse width (PWM) control circuit through voltage sampling amplification circuit. 21, signal conversion circuit 22 and photoelectric coupler and pulse width (PWM) control circuit 23. Since the output anode of LED phase cut dimming power supply passes through LED lamp and field-effect transistor Q7 and then returns to output cathode AGND, lighting intensity of LED lamp changes with the pulse width (PWM) signal imposed on the grid electrode of field-effect transistor Q7, thereby producing dimming effect. The Invention converts the signal obtained by the primary sampling and amplification of LED phase cut dimming power supply into the pulse width (PWM) signal at the primary side and then transmits it through the photoelectric coupler to the secondary side. Therefore, it eliminates the signal distortion caused by the optocoupler temperature drift. Moreover, the pulse width (PWM) signal convened with the use of the signal conversion circuit, which is composed of the comparator or the amplifier, does not have levels, making the dimming light more gentle. In addition, since the signal processing with the Invention is not highly correlated with the main circuit of LED phase cut dimming power supply, it will not be restricted by the load power of LED phase cut dimming power supply, and the dimming range may also be adjusted through the voltage sampling amplification circuit. Meanwhile, the pulse width (PWM) signal converted with the use of the signal conversion circuit, which is composed of the comparator or the amplifier, does not have levels, making the dimming light more gentle. Therefore, the Invention has no restriction on load power and has a better adjustment of the dimming range, small temperature drift, gentle dimming light and other advantages.

The Invention can be widely used in the field of LED phase cut dimming power supply.

The invention claimed is:

1. A kind of pulse width dimming control circuit for LED phase cut dimming power supply, comprises a LED phase cut dimming power supply circuit and a pulse width dimming control circuit, wherein the pulse width dimming control circuit is composed of a voltage sampling amplification circuit, a signal conversion circuit, a photoelectric coupler and a pulse width control circuit, which are made with electric connection in turn; the LED phase cut dimming power supply circuit is composed of a main supply input live line terminal, a null line terminal, an anti-interference circuit, an anti-interference circuit output terminal live line, an anti-interference circuit output terminal null line, a power supply terminal I, a power supply terminal II, a circuit public terminal I and a circuit public terminal II; the signal input terminal of the voltage sampling amplification circuit is connected to the main supply input live line terminal and null line terminal or to the LED phase cut dimming main power supply input live line L and the mill line N after passing through the anti-interference circuit for voltage sampling; the output control part of the pulse width PWM control circuit consists of a field-effect transistor, the drain electrode of which connects to the LED lamp, while the source electrode of which connects to the circuit public terminal II.

2. The kind of pulse width dimming control circuit for LED phase cut dimming power supply according to claim 1, wherein the voltage sampling amplification circuit comprises a diode I, a diode II, a resistance I, a resistance II, a resistance III, a resistance IV, a resistance V, a resistance VI, a capacitance I, a capacitance II and a comparing amplifier integrated chip; the anode of the diode I and that of the diode II are respectively connected to the anti-interference circuit output terminal live line and the anti-interference circuit output terminal null line; the cathode of the diode I and that of the diode II are connected with each other and connected to one end of the resistance I; the other end of the resistance I is connected to one end of the resistance II and one end of the resistance III; the other end of the resistance II is connected to the circuit public terminal I, and the other end of the resistance III is connected to the capacitance I and the $1^{st}$ pin of the comparing amplifier integrated chip; the other end of the capacitance I is connected to the circuit public terminal I; the $2^{nd}$ pin of the comparing amplifier integrated chip is connected to the circuit public terminal I; the $3^{rd}$ pin of the comparing amplifier integrated chip is connected to one end of the resistance IV and one end of the resistance V; the other end of the resistance IV is connected to the circuit public terminal I, and the other end of the resistance V is connected to the resistance VI and the $4^{th}$ pin of the comparing amplifier integrated chip; the $5^{th}$ pin of the comparing amplifier integrated chip is connected to the power output terminal I; the other end of the resistance VI is connected to one end of the capacitance II and the signal conversion circuit; the other end of the capacitance II is connected to the circuit public terminal I.

3. The kind of pulse width dimming control circuit for LED phase cut dimming power supply according to claim 1, wherein the signal conversion circuit comprises a comparator integrated chip, a linear voltage regulator integrated chip, a diode III, a NPN triode I, a NPN triode II, a PNP triode I, a resistance VII, a resistance VIII, a resistance IX, a resistance X, a resistance XI, a resistance XII, a resistance XIII, a resistance XIV and a capacitance III; the $1^{st}$ pin of the comparator integrated chip is connected to one end of the resistance XI and the base of the NPN triode I; the other end of the resistance XI is connected to the power output terminal I; the $2^{nd}$ pin of the comparator integrated chip is connected to the voltage sampling amplification circuit; the $3^{rd}$ pin of the comparator integrated chip is connected to the $6^{th}$ pin of the comparator integrated chip, the anode of the diode III and one end of the resistance VII; the $4^{th}$ pin of the comparator integrated chip is connected to the circuit public terminal I; the $5^{th}$ pin of the comparator integrated chip is connected to one end of the resistance VIII, one end of the resistance IX and one end of the resistance X; the other end of the resistance VIII is connected to the $7^{th}$ pin of the comparator integrated chip and the cathode of the diode III; the other end of the resistance X is connected to the circuit public terminal I; the other end of the resistance IX is connected to the other end of the resistance VII, one end of the capacitance III and the $1^{st}$ pin of the linear voltage regulator integrated chip; the other end of the capacitance III is connected to the circuit public terminal I; the $2^{nd}$ pin of the linear voltage regulator integrated chip is connected to the circuit public terminal I; the $3^{rd}$ pin of the linear voltage regulator integrated chip is connected to the power output terminal I; the emitter of the NPN triode I is connected to the circuit public terminal I; the collector of the NPN triode I is connected to one end of the resistance XII, the base of the NPN triode II and the base of the PNP triode I; the other end of the resistance XII is connected to the power output terminal I; the collector of the NPN triode II is connected to the power output terminal I; the emitter of the NPN triode II is connected to the emitter of the PNP triode I, one end of the resistance XIII and one input end of the photoelectric coupler and pulse width PWM control circuit; the collector of the PNP triode I is connected to the circuit public terminal I; the other end of the resistance XIII is connected to one end of the resistance XIV and the other input end of the photoelectric coupler and pulse width PWM control circuit; the other end of the resistance XIV is connected to the circuit public terminal I.

4. The kind of pulse width dimming control circuit for LED phase cut dimming power supply according to claim 1, wherein the photoelectric coupler and pulse width PWM control circuit comprises a photoelectric coupling integrated chip, a NPN triode III, a NPN triode IV, a PNP triode II, a field-effect transistor, a resistance XV, a resistance XVI, a resistance XVII and a resistance XVIII; the $1^{st}$ pin of the photoelectric coupling integrated chip is connected to one output end of the signal conversion circuit; the $2^{nd}$ pin of the photoelectric coupling integrated chip is connected to the other output end of the signal conversion circuit; the $3^{rd}$ pin of the photoelectric coupling integrated chip is connected to one end of the resistance XV and the base of the NPN triode III; the $4^{th}$ of the photoelectric coupling integrated chip is connected to the circuit public terminal II; the other end of the resistance XV is connected to the power output terminal II; the emitter of the NPN triode III is connected to the circuit public terminal II; the collector of the NPN triode III is connected to one end of the resistance XVI, the base of the NPN triode IV and the base of the PNP triode II; the other end of the resistance XVI is connected to the power output terminal II; the collector of the NPN triode IV is connected to the power output terminal II; the emitter of the NPN triode IV is connected to the emitter of the PNP triode II and one end of the resistance XVII; the collector of the PNP triode II is connected to the circuit public terminal II; the other end of the resistance XVII is connected to one end of the resistance XVII and the grid electrode of the field-effect transistor; the other end of the resistance XVII is connected to the circuit public terminal II; the source electrode of the field-effect transistor is connected to the circuit public terminal II; the drain electrode of the field-effect transistor is connected to the cathode of the LED lamp that requires dimming.

* * * * *